US007268514B2

(12) United States Patent
DeLange et al.

(10) Patent No.: US 7,268,514 B2
(45) Date of Patent: Sep. 11, 2007

(54) MOTOR CONTROL FOR STOPPING A LOAD AND DETECTING MECHANICAL BRAKE SLIPPAGE

(75) Inventors: Robert J. DeLange, Greenfield, WI (US); Timothy M. Rowan, Wauwatosa, WI (US); Roman W. Lichon, West Bend, WI (US); Glenn E. Frazier, Germantown, WI (US); Lynn J. Cooksey, Menomonee Falls, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 469 days.

(21) Appl. No.: 11/002,011

(22) Filed: Nov. 30, 2004

(65) Prior Publication Data

US 2006/0113148 A1 Jun. 1, 2006

(51) Int. Cl.
*B66B 1/32* (2006.01)
*B66B 1/40* (2006.01)
*H02P 21/00* (2006.01)
*H02P 3/00* (2006.01)

(52) U.S. Cl. ...................... 318/757; 318/760; 318/758; 318/369; 318/461; 318/468; 187/291; 187/293

(58) Field of Classification Search ................ 318/757, 318/758, 460, 369, 461, 468; 187/291, 293
See application file for complete search history.

(56) References Cited

U.S. PATENT DOCUMENTS 4,380,049 A * 4/1983 Makinen ...................... 701/70
4,475,631 A * 10/1984 Nomura ...................... 187/296
4,491,197 A * 1/1985 Nishiwaki ................... 187/296
5,155,305 A * 10/1992 Horbruegger et al. ...... 187/293
5,265,701 A * 11/1993 Ogasawara et al. ......... 187/254
5,457,372 A * 10/1995 Pignatelli et al. ........... 318/760
5,811,957 A * 9/1998 Bose et al. ................. 318/802
6,094,024 A * 7/2000 Westlake .................... 318/375
6,147,470 A * 11/2000 Ohashi et al. .............. 318/757
6,264,005 B1 * 7/2001 Kang et al. ................. 187/290
6,283,252 B1 * 9/2001 Lee ............................ 187/291
6,326,762 B1 * 12/2001 Jiang et al. ................. 318/811
6,459,224 B2 * 10/2002 Itoh et al. ................... 318/445
6,459,980 B1 * 10/2002 Tabata et al. ................ 701/70

* cited by examiner

*Primary Examiner*—Lincoln Donovan
*Assistant Examiner*—Eduardo Colon Santana
(74) *Attorney, Agent, or Firm*—Quarles & Brady LLP; Alexander M. Gerasimow

(57) ABSTRACT

A method and apparatus for stopping an AC motor that is controlling a load while detecting mechanical brake slippage of a mechanical brake for holding the load against movement includes a controller for decreasing torque-producing current commands from the drive while a speed regulator is commanding zero speed, sensing movement of the load while the speed regulator is commanding zero speed, detecting movement of the load past a pre-determined distance limit, and increasing torque to support the load and prevent further movement of the load. The controller will again decrease torque-producing current commands from the drive, and again checking for movement of the load, and upon sensing no load movement upon reaching zero torque, then shutting off the motor.

9 Claims, 2 Drawing Sheets

MOTOR CONTROL FOR STOPPING A LOAD AND DETECTING MECHANICAL BRAKE SLIPPAGE

CROSS-REFERENCE TO RELATED APPLICATIONS

Not Applicable

STATEMENT REGARDING FEDERALLY SPONSORED RESEARCH

Not Applicable

TECHNICAL FIELD

The field of the invention is control systems for controlling the operation of AC motors.

BACKGROUND ART

Motors are often used for providing lifting or hoisting power for a load. These loads are often held by a mechanical brake when stopped. Several problems arise in controlling such a load. First, there is a need to bring the load to a stop at a precise height, in the case of an elevator for example. Second, there is a need to detect any brake slippage, which can be the result of mechanical wear on the brake or other factors.

U.S. Pat. No. 5,457,372, discloses a braking method for stopping a hoist motor in which there is a power sensing circuit for sensing the power applied in stopping a load and storing a sampling signal. The basic braking method uses DC current (zero frequency current) that is injected into the stator windings of an AC motor. This produces a stationary magnetic field in the motor air gap to oppose rotation. This basic stopping technique is modified by utilizing the sampling signal. This method does not address the problems of mechanical wear on the brake as discussed above.

SUMMARY OF THE INVENTION

The invention relates a method and apparatus for A method for stopping an AC motor that is controlling a load while detecting mechanical brake slippage of a mechanical brake for holding the load against movement, by decreasing torque-producing current commands from the drive while a speed regulator is commanding zero speed, by sensing movement of the load while the speed regulator is commanding zero speed, by detecting movement of the load past a pre-determined distance limit, and by increasing torque to support the load and prevent further movement of the load.

The invention decreases torque-producing current commands from the drive while a speed regulator is commanding zero speed. If the brake is not functioning properly, the motor will start to turn when the torque limit is less than the load torque required to hold the load. During reduction of the commanded torque, position feedback is monitored to detect a movement of the shaft and load that indicates mechanical brake slippage. If the change in position exceeds a defined number of brake slip counts before the control reaches zero torque, an alarm condition is signaled.

When an alarm condition is signaled, the load is allowed to move a programmed distance and then torque limit is substantially increased up to its initial value to hold the load at zero speed and against further slippage. The cycle of decreasing the torque limit, allowing the load to move and stopping the movement continues until the movement of the load stops when the drive removes all torque. This indicates that the load is in a safe position, because the load has been lowered to the ground, or a counterweight has been lowered to the ground and the motor shaft is no longer moving with zero torque applied. At this point the motor control will shut off and the alarm condition will cause start signals to be ignored until power is removed and the brake is serviced. Before shutting off, the operator is allowed to enter a run mode to manually raise or lower the load before shutting off.

These and other objects and advantages of the invention will be apparent from the description that follows and from the drawings which illustrate embodiments of the invention, and which are incorporated herein by reference.

DETAILED DESCRIPTION OF THE PREFERRED EMBODIMENTS

Figure 1:
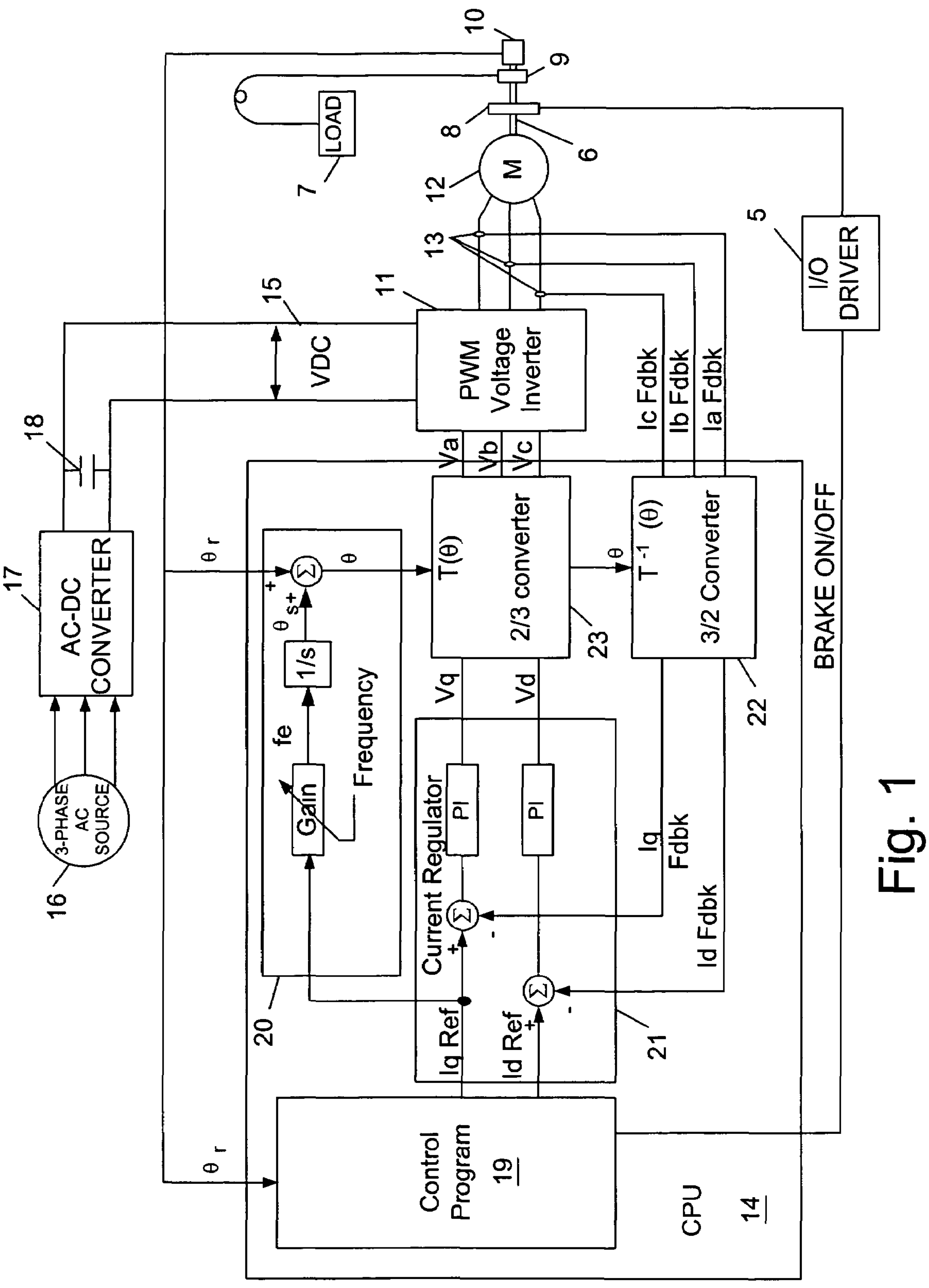
FIG. 1 is a block diagram of a motor drive for practicing the method of the present invention.

As seen in FIG. 1, the present invention involves a motor control for stopping an AC motor 12 of the type for providing lift power for a load 7. The load 7 is hoisted by rotation of a motor shaft 6, which is coupled to the load through a suitable mechanical coupling device 9. A CPU 14 under control of a control program 19 controls a mechanical brake 8, which is applied to stop the rotation of the motor output shaft 6. The CPU 14 is electrically connected to the brake 8 through a suitable I/O driver circuit 5 to provide a BRAKE ON/OFF signal. An encoder 10 on the motor output shaft 6 senses speed of the shaft as well as small position changes in the shaft 6 at low speed.

As further seen in FIG. 1 the motor control CPU 14 is connected to supply three-phase voltage signals, Va, Vb and Vc to a PWM voltage inverter 11 in the motor drive, which in turn supplies current to an AC motor 12. Current feedback devices 13 are placed in the lines going to the motor 12 and provide current feedback signals, $I_{a\ Fdbk}$, $I_b$ Fdbk and $I_c$ Fdbk to the motor control CPU 14. The motor control CPU 14 is preferably a microelectronic CPU operating according to instructions in a stored control program 19.

The PWM inverter 11 receives power from a DC bus 15, which receives power from an AC source 16 that is rectified by rectifier 17 to provide DC voltage on the DC bus 15. A capacitor 18 (here specify function of the capacitor.) Execution of program instructions in the control program 19 results in current commands in the d-q reference frame, $I_q$ Ref (torque command) and $I_d$ Ref (field flux command). The torque command $I_q$ Ref is multiplied by an adjustable gain function (GAIN) to produce a slip frequency command ($f_s$). This slip frequency command ($f_s$) is integrated, as represented by the "1/s" function to provide a slip angle command ($\theta_s$) for a motor controlled in accordance with vector control theory. In vector control, the vector control commands are resolved along a d-axis and a q-axis, where the q-axis commands represent the vector multiplied by the sin θ and d-axis commands represent the torque vector multiplied by the cos θ. For further information of vector control theory, reference is made to U.S. Pat. No. 5,140,248, assigned to the assignee of the present invention.

The encoder 10 is a speed/position feedback device, which provides a position feedback signal ($\theta_r$) responsive to the speed of the motor 12. This is summed with the commanded slip frequency/position ($\theta_s$) to provide a resultant torque angle command ($\theta$). This represents a typical motor control with speed feedback. The position feedback signal ($\theta_r$) is also made available to the control program 19 as part of the speed regulator and to detect mechanical brake slippage.

The execution of the control program 19 also provides a Current Regulator loop 21 in which current commands in the d-q reference frame, $I_q$ Ref and $I_d$ Ref are algebraically summed (actually, by subtracting) feedback signals $I_q$ Fdbk and $I_d$ Fdbk, which are the result of processing feedback signals, $I_{a\ Fdbk}$, $I_b$ Fdbk and $I_c$ Fdbk through a 3-phase to 2-phase converter 22. This produces two differences that are processed through respective PI (proportional-integrator) control loops to produce, $V_q$ and $V_d$ commands to a 2-phase to 3-phase converter 23. This converter 23 also receives the torque angle command ($\theta$) and together with the $V_q$ and $V_d$ commands, produces the phase voltage outputs $V_a$, $V_b$ and $V_c$ to the PWM inverter 11.

According to the invention, if it is now desired to stop the motor 12 and the load 7, while checking for any mechanical slippage before turning off torque-producing current to the motor 12. A program routine represented by the flow chart in FIG. 2 is executed to carry out these operations.

Figure 2:
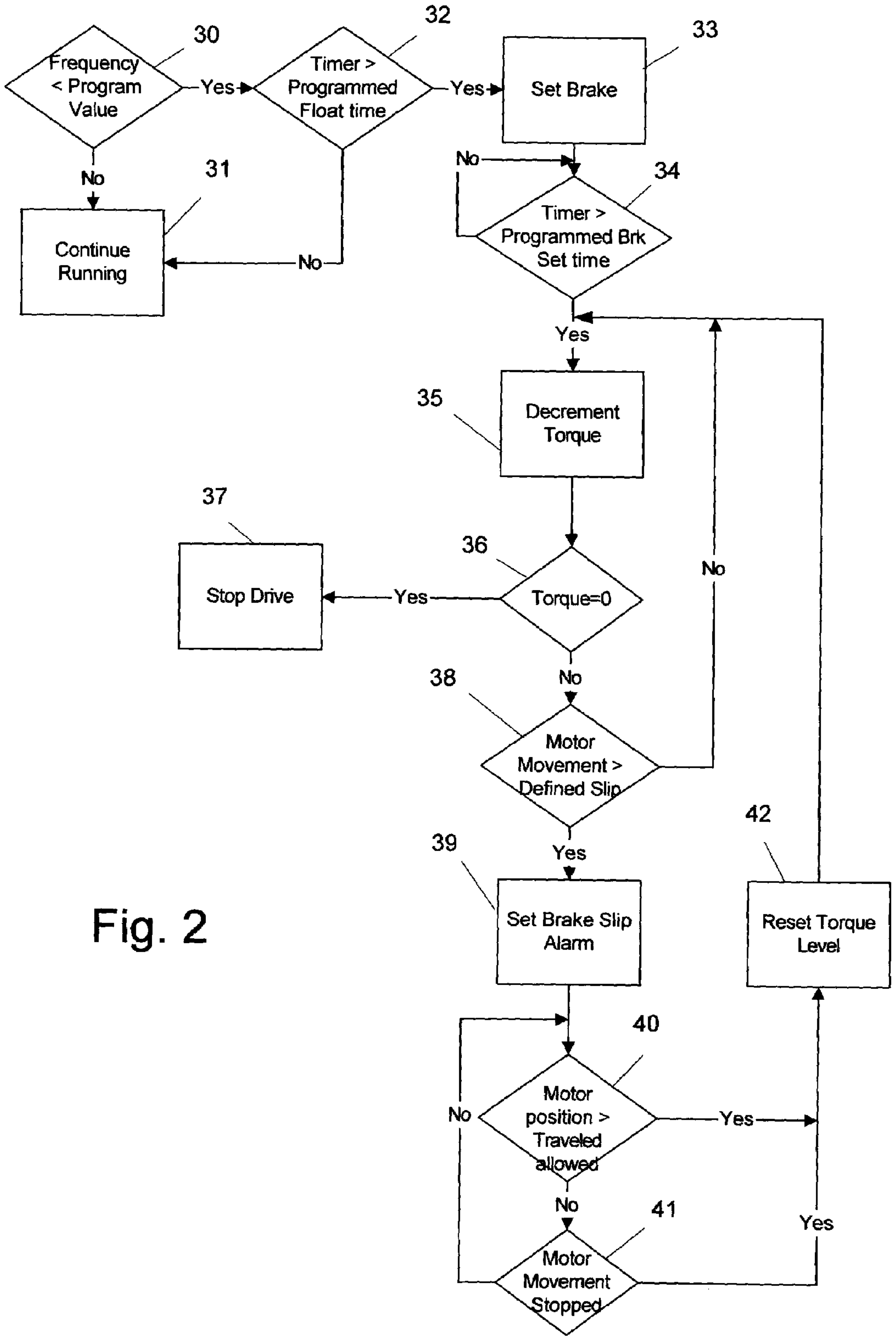
FIG. 2 is a flow chart of a routine in a control program for controlling operation of the motor drive of FIG. 1.

Referring to FIG. 2, the entry into the routine is represented by decision block 30, which is executed to check for slowing of the motor as shown by a decrease in frequency below a program limit value. If the result of this test is negative, as represented by the "No" result, then the program continues in a "run mode" represented by process block 31. If the result of this test is positive, as represented by the "Yes" result, then the program proceeds to executes a test instruction represented by decision block 32 to determine if the speed has been stable for a set time. Assuming that the speed has been steady and not transient, then a set brake command is executed as represented by process block 33. Then the CPU 14 proceeds to execute an instruction represented by decision block 34 to apply the brake for a certain time before proceeding to decrement torque commands in process block 35. A check represented by decision block 36 is made to see if torque is zero, when power to the drive will be stopped, as represented by process block 37. If torque is not at zero, the position of the motor shaft will be sensed to determine if there has been movement in a direction indicating slippage of the brake, as represented by decision block 38. At this point, the applied torque is holding the load rather than moving it. Assuming there is not any movement indicating brake slippage, then the routine loops back to process block 35 to reduce torque until all torque is removed as sensed in decision block 36.

In the event that mechanical brake slippage is detected in decision block 38, then a brake alarm is actuated as represented by process block 39. Then brake slippage is monitored again as represented by decision block 40, and if continue slippage is detected, torque is increased to hold the load against further movement against the brake as represented by process block 42. If motor movement has stopped prior to exiting via block 40 as detected by executing decision block 41, then the routine will proceed to block 42 and then will loop until torque is decremented to zero by executing process block 35. The routine will then shut-off the drive.

The invention decreases torque-producing current commands from the drive while the speed regulator is commanding zero speed. If the brake is not functioning properly, the motor will start to turn when the torque limit is less than the load torque required to hold the load. During reduction of the commanded torque, position feedback is monitored to detect movement of the shaft and load indicating mechanical brake slippage. If the change in position exceeds the defined number of brake slip counts before the control reaches zero torque, an alarm condition is signaled.

When an alarm condition is signaled, the load is allowed to move a programmed distance and then torque limit is substantially increased up to its initial value to hold the load at zero speed and against further slippage. The cycle of decreasing the torque limit, allowing the load to move and stopping the movement continues until the movement of the load stops when the drive removes all torque. This indicates that the load is in a safe position, because the load has been lowered to the ground, or a counterweight has been lowered to the ground and the motor shaft is no longer moving with zero torque applied. At this point the motor control will shut off and the alarm condition will cause start signals to be ignored until power is removed and the brake is serviced. Before shutting off, the operator is allowed to enter a run mode to manually raise or lower the load before shutting off.

This has been a description of a preferred embodiment of the invention. It will be apparent that various modifications and details can be varied without departing from the scope and spirit of the invention, and these are intended to come within the scope of the following claims.

We claim:

1. A method for stopping an AC motor that is controlling a load while detecting mechanical brake slippage of a mechanical brake for holding the load against movement, the method comprising:

decreasing torque-producing current commands while a speed regulator is commanding zero speed;

sensing movement of the load while the speed regulator is commanding zero speed;

detecting movement of the load past a pre-determined distance limit; and increasing torque to support the load and prevent further movement of the load.

2. The method of claim 1, further comprising:

again decreasing torque-producing current commands from the drive; and again checking for movement of the load; and upon sensing no load movement upon reaching zero torque, then shutting off the motor.

3. The method of claim 1, wherein upon reaching the pre-determined distance limit and upon shutting off the motor, not responding to start signals until power is recycled.

4. The method of claim 1, wherein upon reaching the pre-determined distance limit, entering a manual run mode is allowed to manually raise or lower the load before shutting off the motor.

5. A controller for stopping an AC motor that is controlling a load while detecting mechanical brake slippage of a mechanical brake for holding the load against movement, the controller comprising:

a microelectronic CPU for executing a stored control program to provide a speed regulator that receives a base s speed command from the CPU and a speed feedback signal from the motor to provide a resulting speed command that controls the frequency of the AC motor;

the microelectronic CPU also providing a current regulator that receives current feedback responsive to current supplied to the motor and which controls a PWM inverter that supplies current to the motor; and wherein the microelectronic CPU is responsive to program instructions in the stored control program to:

decrease torque-producing current commands while a speed regulator is commanding zero speed;

sense movement of the load while the speed regulator is commanding zero speed;

detect movement of the load past a pre-determined distance limit; and increase torque to support the load and prevent further movement of the load.

6. The controller of claim 5, wherein the CPU is also responsive to program instructions to:

again decrease torque-producing current commands from the drive; and again check for movement of the load; and upon sensing no load movement upon reaching zero torque, then commanding shut off of power to the motor.

7. The controller of claim 5, wherein the CPU is also responsive to program instructions so that upon reaching the pre-determined distance limit and upon shutting off the motor, the controller will not respond to start signals until power is recycled.

8. The controller of claim 5, wherein the CPU is also responsive to program instructions so that upon reaching the pre-determined distance limit, entry into a manual run mode is allowed to manually raise or lower the load before shutting off the motor.

9. The controller of claim 5, further comprising means for generating a brake on/off signal to the mechanical brake holding the load against slippage.

* * * * *